Feb. 10, 1953  F. JOHNSON  2,627,841
SMALL ANIMAL INCUBATOR
Filed Sept. 27, 1949

Inventor
FRANK JOHNSON

By McMorrow, Berman + Davidson
Attorney

Patented Feb. 10, 1953

2,627,841

UNITED STATES PATENT OFFICE 2,627,841

SMALL ANIMAL INCUBATOR

Frank Johnson, Detroit, Mich.

Application September 27, 1949, Serial No. 118,056

2 Claims. (Cl. 119—31)

My invention relates to an incubator for small animals.

An important object of my invention, is to provide a small animal incubator for raising the animals through the critical period of infancy and for treating them during illness.

A further object is to provide an incubator of the above-mentioned type including an exercising compartment for the mother and for the young animals after they are old enough to move about.

A further object is to provide an incubator for small animals which employs a standard type brooder unit, which is thermostatically controlled for providing a properly heated atmosphere, essential for the life of young animals.

A still further object of my invention is to provide a device of the above-mentioned character which is highly simplified, compact, sturdy and quite inexpensive to build.

Other objects and advantages of my invention will be apparent during the course of the following description.

Figure 1:
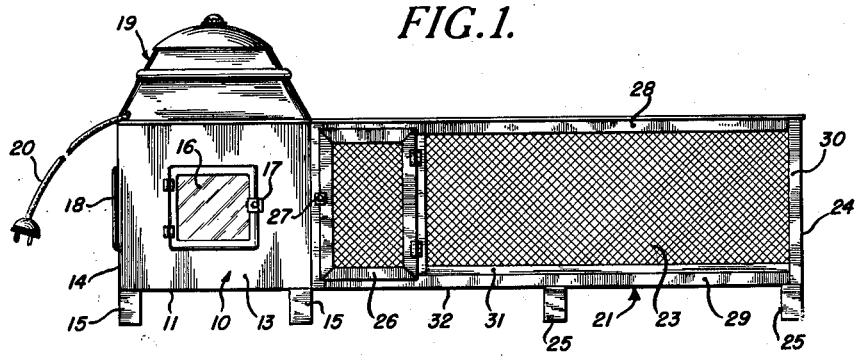
Figure 2:
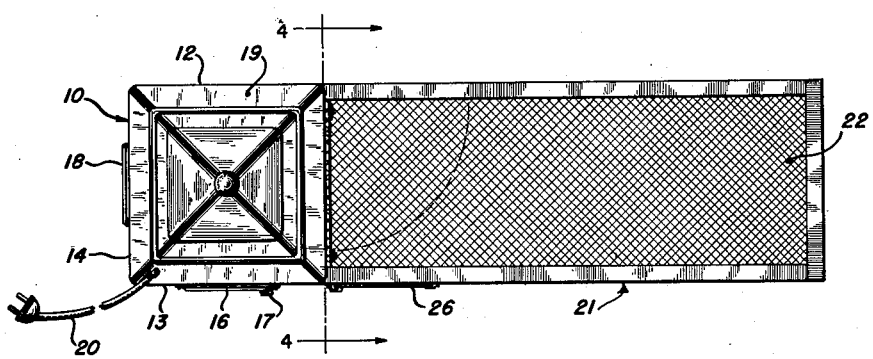
Figure 3:
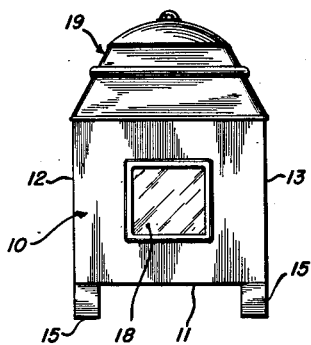
Figure 4:
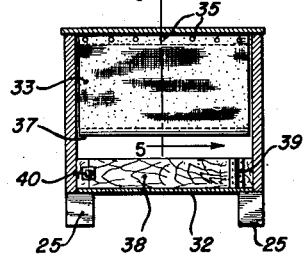
Figure 5:
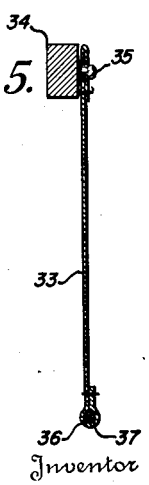

In the accompanying drawings, forming a part of this application, and in which like numerals are employed to designate like parts throughout the same, Figure 1 is a side elevation of a small animal incubator embodying my invention, Figure 2 is a plan view of the same, Figure 3 is an end elevation of the incubator, Figure 4 is a transverse vertical section taken on line 4—4 of Figure 2, and Figure 5 is an enlarged vertical section taken on line 5—5 of Figure 4.

In the drawings, where for the purpose of illustration is shown a preferred embodiment of my invention, the numeral 10 designates a rectangular casing or enclosure including a flat bottom 11, vertical sides 12 and 13 and a vertical end 14. The casing 10 is open at its top and at its end opposite the end 14. Short legs 15 are provided at the four lower corners of the casing 10 so that the bottom 11 will be elevated slightly from the ground. An opening is provided in the side 13, and a glass-paneled access door 16 is hingedly connected with the side 13 adjacent to the opening as clearly shown in Figure 1. A suitable catch 17 may be provided for releasably holding the door 16 in the closed position. The vertical side 14 has a permanently closed centrally located rectangular glass window 18 for the purpose of admitting light to the interior of the casing 10.

A conventional square type chicken brooder unit 19 is provided and mounted upon the open top of the casing 10, and this brooder unit forms the top or ceiling of the casing. The brooder unit 19 includes an electrical heating element, not shown, and has an electric cord 20 which may be plugged into any source of current. The brooder unit is thermostatically controlled for producing the desired temperature inside of casing 10. The construction of the brooder unit 19 is conventional and well known.

Connected with the open side of the container 10 and disposed opposite the side 14 is an elongated rectangular exercising compartment or pen 21 having a top 22, sides 23 and an end 24 of open wire mesh. The end of the exercising compartment 21 adjacent to the casing 10 is open so that the casing 10 and compartment 21 are arranged in communication. The compartment 21 is supported by legs 25 of the same length as the legs 15. The compartment 21 is provided in its side 23 and near the casing 10 with a horizontally swingable hinged access door 26, having a latch 27. The door 26 may have a wire mesh panel, as shown. The compartment 21 further includes an outer rectangular supporting frame, including top and bottom longitudinal rails 28 and 29, and vertical end rails 30. Kick boards or rails 31 extend above the floor 32 of the compartment 21 for a substantial distance, so that the animals will not readily damage the wire mesh sides.

Adjacent to the connected open ends of the casing 10 and exercising compartment 21 is arranged a transversely extending vertical curtain or flap 33 of canvas or the like, connected at its top end to a top horizontal member or bar 34 of the compartment 21 by means of snap fasteners 35, or the like. The curtain or flap 33 extends entirely across the opening between the casing 10 and compartment 21, but terminates a substantial distance above the floors or bottoms 11 and 32, as shown in Figure 4, the floors or bottoms 11 and 32 being at the same elevation. The lower end of the curtain 33 is folded upon itself and stitched to form a tubular loop 36, receiving a weighted rod 37. Below the lower end of the curtain 33 a horizontally swingable low hinged barrier or panel 38 is connected with the opposite sides of the compartment 21, and extends substantially entirely across the opening between the compartment and the casing 10. The top of the barrier 38 is spaced below the bottom of the curtain, as shown in Figure 4, and the barrier is connected to one side of the compartment 21 by a hinge 39 and may be provided at its opposite end with a releasable catch 40, Figure 4.

In use the ill or young animals are kept within the casing 10 and a properly heated atmosphere is provided therein by the brooder unit 19. Access to the casing 10 may be had through the door 16, and light will enter the casing through the window 18. The barrier 38, when closed, is of a height to prevent the young animals from passing thereover and entering the exercising compartment 21. The distance between the top of the barrier 38 and the top 22 of the pen 21 is at least as great as the body height of the adult animal being confined in the brooder, thereby enabling the adult animal to readily step over the barrier 38 and push past the curtain 33 to enter the exercising compartment 21 which is fully ventilated by the wire mesh top, sides and end. Access to the compartment 21 may be had through the door 26, for placing food and water within this compartment for the mother. The curtain 33 will hold the heat within the casing 10 and the space between the curtain and barrier 38 will allow sufficient ventilation within the casing 10. When the small animals grow sufficiently to move about, the barrier 38 may be swung open so that they may enter the exercising compartment 21, the curtain 33 still serving to maintain heat within the casing 10.

It is to be understood that the form of my invention, herewith shown and described, is to be taken as a preferred example of the same, and that various changes in shape, size and arrangement of parts may be resorted to, without departing from the spirit of my invention or the scope of the subjoined claims.

Having thus described my invention, I claim:

1. A brooder for the confinement of adult and young animals, an imperforate casing including a bottom and top and having one end open and the other end closed, a brooder heating unit depending from the top of said casing, a pen having one end open and including a bottom, spaced perforated sides rising from said bottom, a perforated end extending between the sides adjacent the end of the latter remote from the open end of the pen and connected to said sides, and a perforated top extending over and supported upon said sides and said end positioned so that the open end is in registry with the open end of said casing with the bottom abutting the bottom of said casing, the registering open ends of said casing and pen being connected together, a vertically disposed weighted flexible curtain extending transversely across the entire open end of said pen and having the upper end dependingly supported from the top of said pen, the lower end of said curtain being spaced above the bottom of said pen, and a vertically disposed barrier positioned below and in vertical alignment with said curtain and connected to the sides of said pen, for swinging movement from the vertical position to a horizontal position, the lower end of said barrier engaging the bottom of said pen and the upper end of the barrier being spaced from the lower end of said curtain, the distance between the top of the barrier and the top of said pen being at least as great as the body height of the adult animal being confined in said brooder, said barrier being of a height to prevent the young animals from passing thereover.

2. A brooder for the confinement of adult and young animals, an imperforate casing including a bottom and top and having one end open and the other end closed, a brooder heating unit depending from the top of said casing, a pen having one end open and including a bottom, spaced perforated sides rising from said bottom, a perforated end extending between the sides adjacent the end of the latter remote from the open end of the pen and connected to said sides, and a perforated top extending over and supported upon said sides and said end positioned so that the open end is in registry with the open end of said casing with the bottom abutting the bottom of said casing, the registering open ends of said casing and pen being connected together, a vertically disposed weighted flexible curtain extending transversely across the entire open end of said pen and having the upper end dependingly supported from the top of said pen, the lower end of said curtain being spaced above the bottom of said pen, and a vertically disposed barrier positioned below and in vertical alignment with said curtain and connected to the sides of said pen for swinging movement from the vertical position to a horizontal position, the lower end of said barrier engaging the bottom of said pen and the upper end of the barrier being spaced from the lower end of said curtain, the distance between the top of the barrier and the top of said pen being at least as great as the body height of the adult animal being confined in said brooder, said barrier being of a height to prevent the young animals from passing thereover.

FRANK JOHNSON.

REFERENCES CITED

The following references are of record in the file of this patent:

UNITED STATES PATENTS

| Number | Name | Date |
| --- | --- | --- |
| 629,055 | Johnson | Dec. 12, 1899 |
| 654,190 | Thompson | July 24, 1900 |
| 1,123,811 | Showalter | Jan. 5, 1915 |
| 1,507,910 | Dodd | Sept. 9, 1924 |
| 1,986,501 | Conway et al. | Jan. 1, 1935 |

OTHER REFERENCES

"Popular Mechanics," page 217, March 1948.